United States Patent
Barraclough et al.

(10) Patent No.: US 6,208,378 B1
(45) Date of Patent: *Mar. 27, 2001

(54) VIDEO ARRANGEMENT WITH REMOTE ACTIVATION OF APPLIANCES AND REMOTE PLAYBACK OF LOCALLY CAPTURED VIDEO DATA

(75) Inventors: Keith Barraclough, Menlo Park; Bryan R. Martin, Campbell, both of CA (US)

(73) Assignee: Netergy Networks, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,683

(22) Filed: Feb. 23, 1998

(51) Int. Cl.[7] .................................................. H04N 5/232
(52) U.S. Cl. ......................... 348/211; 348/212; 348/213; 348/15
(58) Field of Search .................................... 348/211, 212, 348/213, 15, 1, 2, 14; 379/102.01, 102.02, 102.03; H04N 7/15

(56) References Cited

U.S. PATENT DOCUMENTS

| | | |
|---|---|---|
| 4,885,766 | 12/1989 | Yasuoka et al. . |
| 5,086,385 * | 2/1992 | Launey et al. .................. 379/102.01 |
| 5,255,313 | 10/1993 | Darbee . |
| 5,402,170 * | 3/1995 | Parulski et al. ....................... 348/211 |
| 5,414,761 | 5/1995 | Darbee . |
| 5,473,370 * | 12/1995 | Moronaga et al. ................... 348/231 |
| 5,515,099 * | 5/1996 | Cortjens et al. ........................ 348/15 |
| 5,530,472 * | 6/1996 | Bregman et al. ....................... 348/15 |
| 5,542,102 | 7/1996 | Smith et al. . |
| 5,553,123 | 9/1996 | Chan et al. . |
| 5,554,979 | 9/1996 | Kohar et al. . |
| 5,568,183 * | 10/1996 | Cortjens et al. ........................ 348/15 |
| 5,625,883 | 4/1997 | Leyten et al. . |
| 5,637,964 | 6/1997 | Hakkarainen et al. . |
| 5,652,619 * | 7/1997 | Nakamura et al. .................. 348/211 |
| 5,671,267 | 9/1997 | August et al. . |
| 5,745,161 * | 4/1998 | Ito ......................................... 348/15 |
| 5,748,234 * | 5/1998 | Lippincott ............................ 348/222 |
| 5,754,227 * | 5/1998 | Fukuoka ............................... 348/232 |
| 5,796,424 * | 8/1998 | Ely et al. ................................ 348/15 |
| 5,877,821 * | 3/1999 | Newlin et al. .......................... 348/15 |

\* cited by examiner

*Primary Examiner*—Wendy Garber
*Assistant Examiner*—Mitchell White

(57) ABSTRACT

A video unit provides remote activation of appliances and is capable of recording locally captured video data. The video unit includes an infrared transmitter that generates infrared signals to activate and/or control appliances in response to control codes, e.g. received from a remote site by the video arrangement. The video unit also includes a storage element so that locally captured video data can be stored and played back from a remote location.

11 Claims, 5 Drawing Sheets

VIDEO ARRANGEMENT WITH REMOTE ACTIVATION OF APPLIANCES AND REMOTE PLAYBACK OF LOCALLY CAPTURED VIDEO DATA

FIELD OF THE INVENTION

The present invention relates generally to communication systems and, more particularly, to video communication systems and arrangements.

BACKGROUND OF THE INVENTION

Video communication systems have become increasingly popular. Videoconferencing, for example, is becoming more common in both business and residential applications. Videoconferencing permits audio as well as visual live communication between two remotely located terminals communicating over a single channel. Videoconferencing has had limited success due to, for example, unavailability of a common network interface, overly complex controls, or video quality, limited functionality, inconvenience, and high cost. Improving functionality while simultaneously decreasing costs has proven to be a seemingly unobtainable goal. For this reason, there have been opposing pressures to develop certain more expensive systems having increased functionality and certain other systems that forgo the convenience and quality criteria for the sake of reducing costs.

One recent approach, that attempts to addresses some of the above-mentioned issues, uses a digital video camera coupled to the input port of a PC which is programmed to provide videoconferencing over a communications channel, such as the Internet. This approach is useful for applications where a PC is readily available and the user is fully familiar with downloading the software and using the PC to control the videoconferencing. However, the approach is disadvantageous for environments directed to those who are not as computer literate or not interested in using a computer for videoconferencing.

The above types of implementations are, of course, a compromise. Ideally, videoconferencing systems and equipment can be provided for both business and residential applications at reasonable costs and without sacrificing video quality, functionality, or convenience. The present invention is directed to accommodating this ideal.

SUMMARY OF THE INVENTION

The present invention is directed to methods and arrangements for use in videoconferencing. According to one embodiment, the invention is directed to a video arrangement that, via a communications channel, provides for storage of locally captured digital images and remote activation of appliances coupled to infrared receiver arrangements. The video arrangement comprises: a processor configured and arranged to generate control signals in response to control signals received through the communications channel and selectively store the locally captured digital images; a camera circuit arrangement coupled to the processor, configured and arranged to provide digital video images to the processor; a first storage element coupled to the processor; and an infrared transmitter coupled to the processor and responsive to the control signals from the processor.

In another aspect of the invention, an apparatus is provided for storage of locally captured digital images and remote activation of appliances coupled to infrared receiver arrangements in a videoconferencing arrangement coupled to a communications channel. The apparatus comprises: means for generating control signals in response to control signals received via the communications channel; means for providing the control signals from the generating step to an infrared transmitter; means for transmitting infrared signals to the infrared receiver arrangements; means for capturing digital images in response to the control signals received via the communications channel; means for storing the digital images for selective playback.

In another aspect of the invention, a method is provided for storage of locally captured digital images and remote activation of appliances coupled to infrared receiver arrangements in a videoconferencing arrangement coupled to a communications channel. The method comprises the steps of: generating control signals in response to control signals received via the communications channel; providing the control signals from the generating step to an infrared transmitter; transmitting infrared signals to the infrared receiver arrangements; capturing digital images in response to the control signals received via the communications channel; and storing the digital images for selective playback.

The above summary of the invention is not intended to describe each disclosed embodiment of the present invention. An overview of other example aspects and implementations will be recognized from the figures and from the detailed description that follows.

BRIEF DESCRIPTION OF THE DRAWINGS

Other aspects and advantages of the present invention will become apparent upon reading the following Detailed Description and upon reference to the drawings in which.

Figure 1:
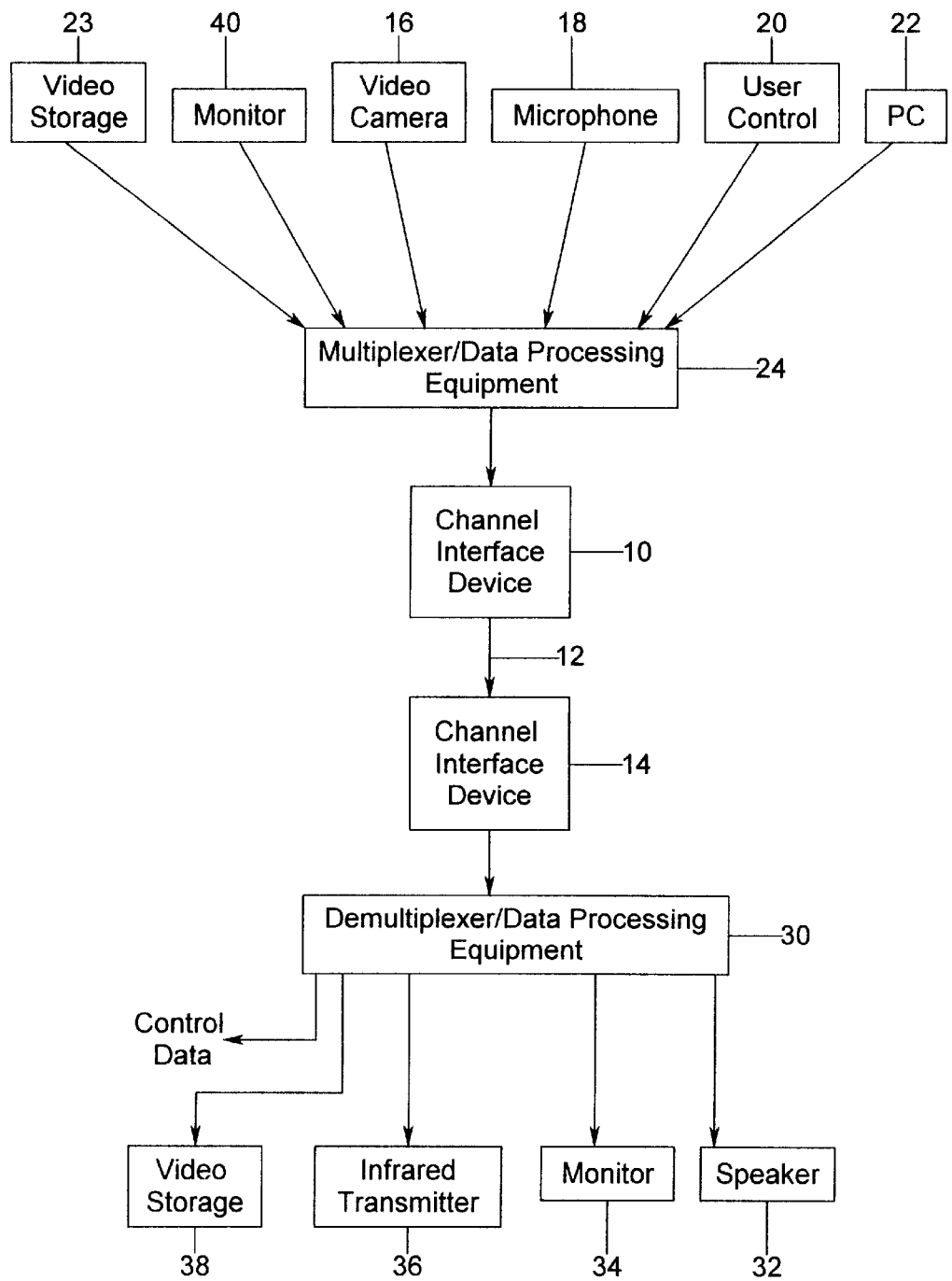
FIG. 1 is a block diagram of a videoconferencing system, according to a particular application of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalent and alternative falling within the spirit and scope of the invention as defined by the appended claims.

DETAILED DESCRIPTION

While the present invention may be useful in a variety of applications, the present invention has been found to be particularly advantageous in videoconferencing applications requiring or benefiting from remote activation of appliances with a videoconferencing arrangement and/or remote playback of stored video data locally captured by the videoconferencing arrangement, and also remote playback of videomail. An appreciation of various aspects of the invention is best gained through a discussion of various application examples operating in such an environment.

Turning now to the drawings, FIG. 1 illustrates a data processing system for a videoconferencing application. The system includes data sending equipment depicted above communication channel 12 and data receiving equipment depicted below communication channel 12. While the sending and receiving of such data is often reciprocal in many data processing applications of this type as with the instant videoconferencing illustration, the configuration illustrated in FIG. 1 can be implemented in this form as well and will be discussed in this regard to facilitate discussion.

At the sending end of the system of FIG. 1, a transmitting channel interface device 10 is used to send processed data over the communication channel 12 to a receiving channel interface device 14. The data that is presented to channel interface device 10 is collected from various types of data sources including, for example, video camera 16, microphone 18, user control device 20, and conventional personal computer 22. In addition, video data may be read from video storage device 23. The data sources typically use buffers to store the data to be collected. The data collected from each of these data sources is received by multiplexer/data processing equipment (MDPE) 24. MDPE 24 collects and formats the data collected from each of the input sources for transmission over channel 12. Monitor 40 is optionally used with video camera 16 to monitor the manner in which video camera 16 captures the video images.

At the lower end of the system of FIG. 1, the formatted data communicated over channel 12 is received by channel interface device 14, which then presents the received data to demultiplexer/data processing equipment (DDPE) 30. DDPE 30 is set up to sort out the formatted data received over channel 12 according to instructions previously sent by MDPE 24. The demultiplexed data is then presented to the appropriate output source equipment, including audio data to speaker 32, video data to monitor 34, and control data to external equipment for subsequent processing. For example, such control data may be provided to an infrared transmitter 36. Infrared transmitter 36 interprets the control data and in response thereto generates appropriate infrared signals. The infrared signals may be used to power-on and power-off various appliances, and control modes of operation of such appliances. The demultiplexed data may also be presented to video storage device 38 for storage therein.

MDPE 24 formats the collected data for transmission using any of a variety of modes of operation or capabilities. For example, audio data may be formatted using a capability that supports the ITU-T G.711, G.723, or G.728 standard. For further information regarding usage of a multiplexer to increase use of the transmission channel for video data, reference may be made to U.S. patent application Ser. No. 08/815,966, entitled "Data Processor Having Controlled Scalable Input Data Source And Method Thereof," filed on Mar. 13, 1997, now U.S. Pat. No. 6,026,097, issued Feb. 15, 2000, and incorporated herein by reference.

Figure 2:
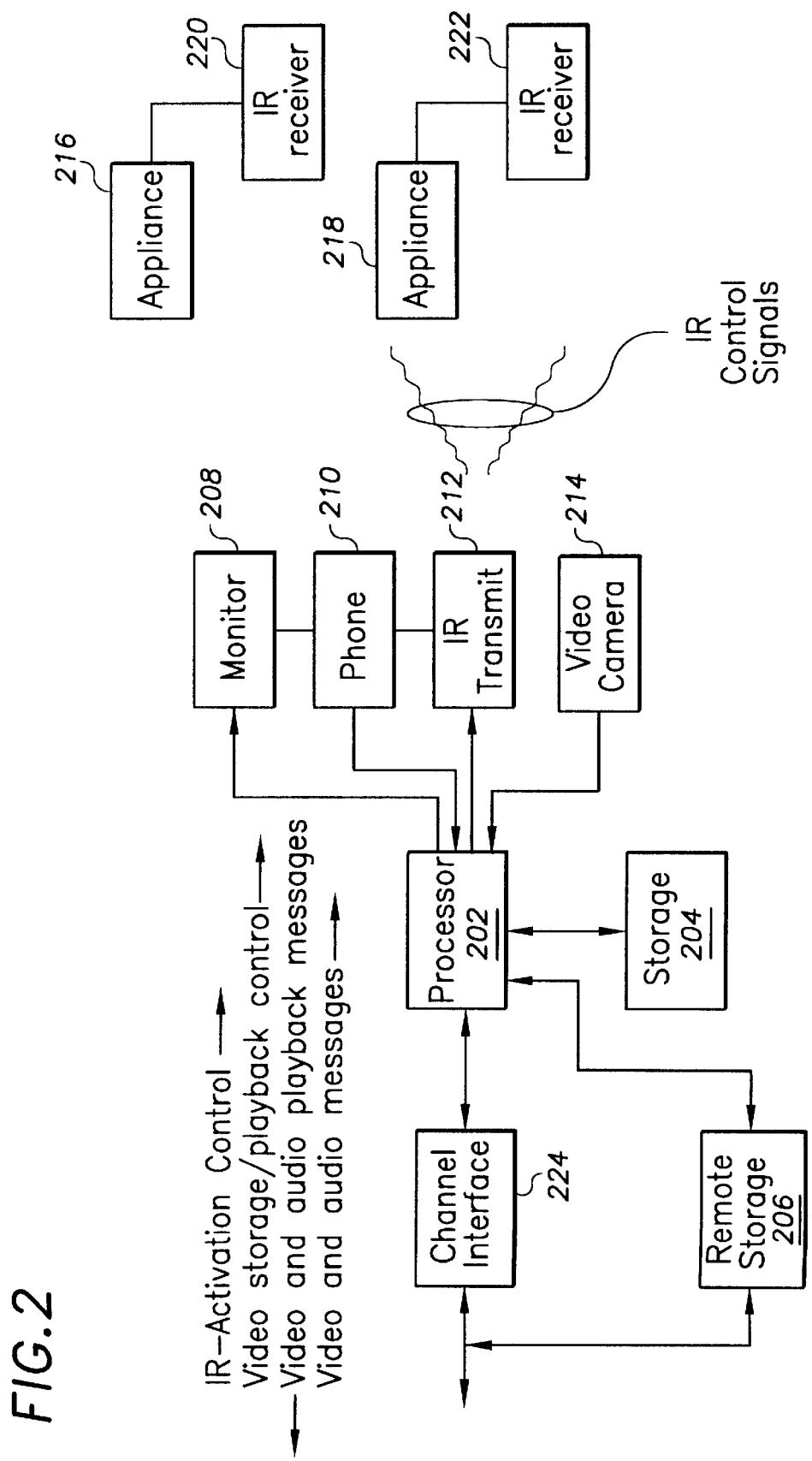
FIG. 2 is a block diagram of a videoconferencing arrangement, illustrating an example implementation of one terminal shown in the system of FIG. 1, according to another particular application of the present invention.

FIG. 2 is a block diagram of a videoconferencing arrangement, illustrating an example implementation of one terminal shown in the system of FIG. 1. The arrangement of FIG. 2 includes a processor 202 that directs overall operation of the videoconferencing arrangement. Coupled to processor 202 is a local storage element 204 and a remote storage element 206. Local storage element 204 may be coupled to processor 202 via a system bus or via a LAN interconnect. Remote storage element 206 illustrates storage that is provided at a site that is remote relative to the site having processor 202 and storage 204. For example, remote storage element 206 may be coupled to processor 202 via a WAN. Processor 202 is also coupled to monitor 208, telephone 210, infrared transmitter 212, and video camera 214.

The videoconferencing arrangement in FIG. 2 is directed to remote operation and control of appliances 216 and 218. Such appliances may include, for example, lights, security systems, stereo systems, and various other appliances for which remote control and operation may be desired. Coupled to appliances 216 and 218 are infrared receivers 220 and 222, respectively. Infrared receivers 220 and 222 are conventional and are configured and arranged to respond to infrared signals generated by infrared transmitter 212. Infrared receivers 220 and 222 decode such IR control signals and provide them to the respective appliance 216 and 218.

Operationally, IR-activation control signals are received by processor 202 via channel interface 224. Such IR-activation control signals are provided, for example, via entry from a telephone keypad or a computer keyboard. The IR activation control signals are interpreted by processor 202 for activating IR transmitter 212. The IR activation control signals may include control codes that indicate control sequences that are to be provided to infrared receivers such as 220 and 222. Thus, for example, to activate appliance 216, an IR-activation control signal is generated at a remote keypad, which is in communication with processor 202, in response to the IR-activation control signal, processor 202 sends control signals to IR transmitter 212, IR transmitter 212 then generates infrared signals that are received by IR receiver 220, and IR receiver 220 generates control signals for activating and/or controlling appliance 216.

The example videoconferencing arrangement of FIG. 2 also provides for remote playback of locally captured and/or stored video data. As with remote activation of appliances via infrared transmitter 212, control signals for initiating remote playback may be initiated via a telephone keypad or computer keyboard, for example. Video and audio storage/playback control signals are received by processor 202 via channel interface 224. In response thereto, processor 202 initiates the desired function. For example, for a storage function, processor 202 receives video data from video camera 214 and stores such video data in local storage element 204. In another example embodiment, when storage element 204 reaches its storage capacity for video data, processor 202 stores subsequent video data in remote storage element 206. Once the locally captured video data is stored it may be read by processor 202 and then transmitted via channel interface 224 to a remote videoconferencing arrangement. In an example application, remote activation of appliances via infrared transmitter 212 may be used in combination with locally capturing and storing video data. In such an application, the storage of the locally captured video data may be used to verify that the remote activation and/or control of the appliances functioned correctly.

Figure 3:
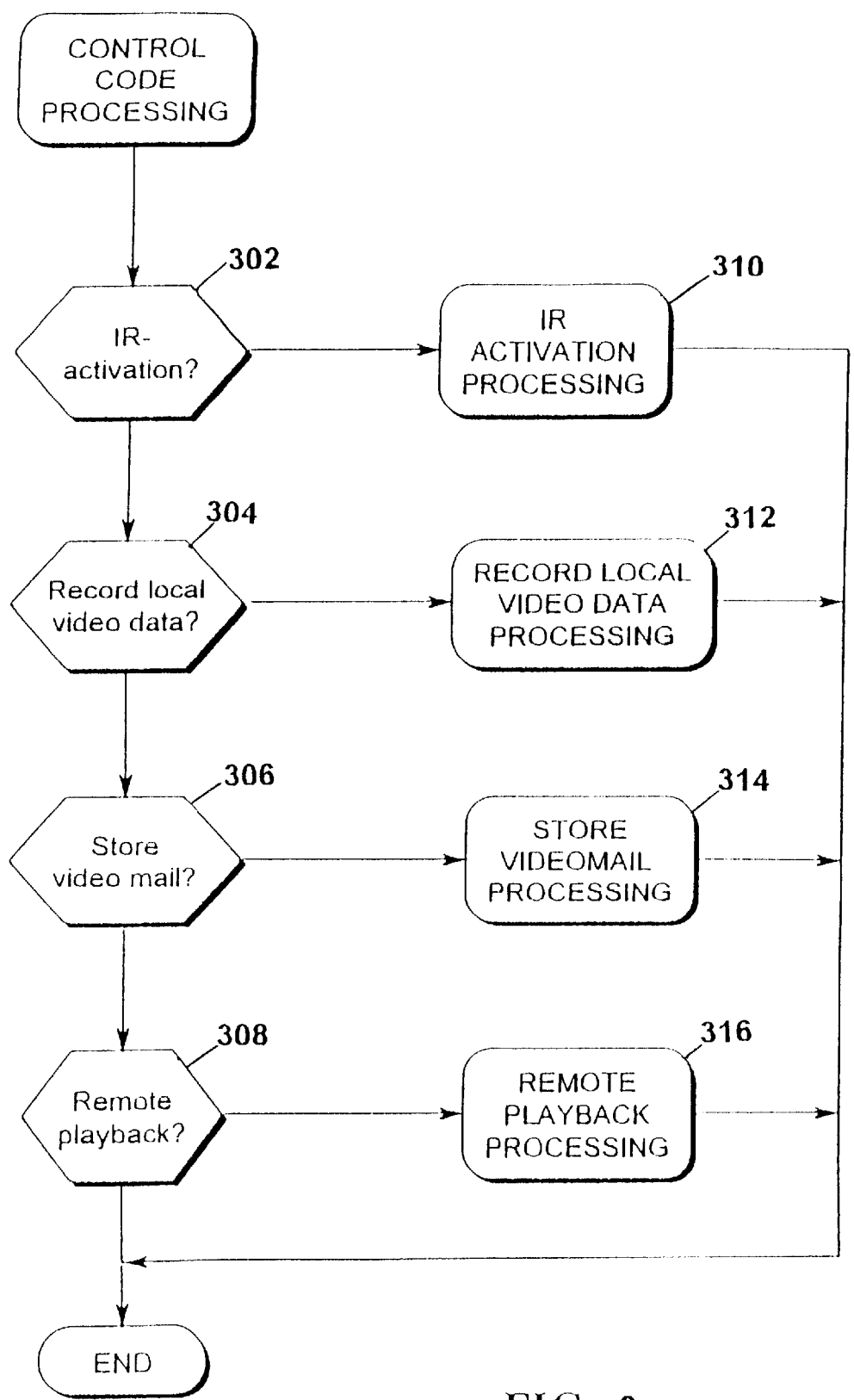
FIG. 3 is a flowchart of an example method for processing control codes received by the processor of FIG. 2.

FIG. 3 is a flowchart of an example method, as performed by processors 202, for processing control codes. Processing blocks 302, 304, 306, and 308 identify the input control code. If the input control code indicates IR-activation, IR activation processing is initiated as indicated by block 310; if the input control code indicates record local video data, control block 312 activates record local video data processing; if the control code indicates store videomail, processing block 314 activates store videomail processing; and if the control code indicates remote playback, processing block 316 activates remote playback processing. Processing blocks 310, 312, 314, and 316 are further described in connection with the figures that follow.

Figures 4, 5:
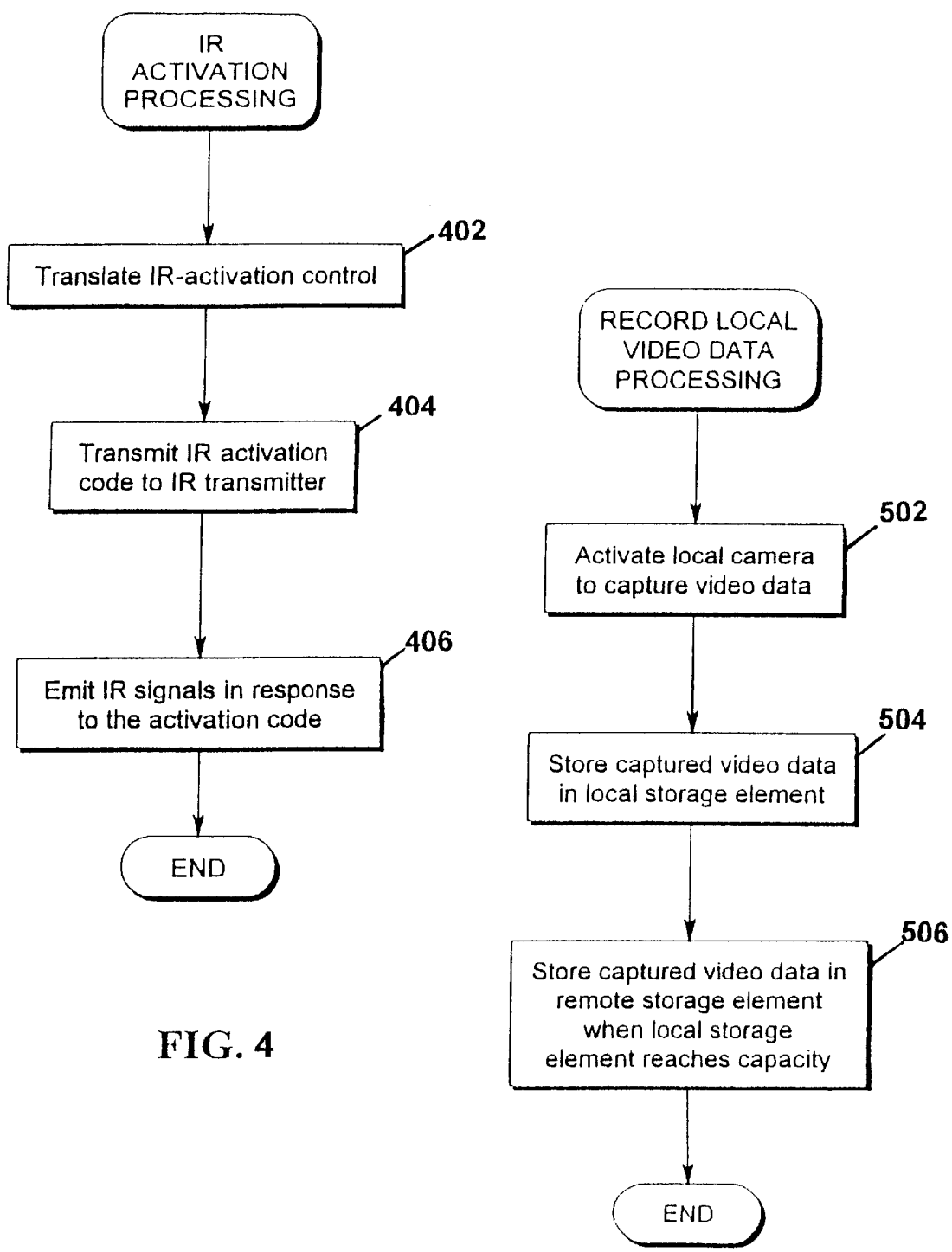
FIG. 4 is a flowchart of an example method, as performed by the system of FIG. 2, for remote activation of appliances via infrared signals.
FIG. 5 is a flowchart of an example method, as performed by the videoconferencing arrangement of FIG. 2, for locally capturing and recording video data.

FIG. 4 is a flowchart of an example method, as performed by the example system of FIG. 2, for IR activation processing. At step 402, processor 202 translates the input IR-activation control code to a code that is compatible with infrared transmitter 212. The translated IR-activation code is then provided to IR transmitter 212 as shown by block 404. In response thereto, infrared transmitter 212 generates infrared signals that correspond to the input control code, as shown by processing block 406. IR receivers 220 and 222 then respond to the transmitted IR signals.

FIG. 5 is a flowchart of an example method for recording local video data in response to control codes received via channel interface 224. At block 502, processor 202 activates video camera 214 to begin capturing video data. Video camera 214 provides the video data to processor 202, and processor 202 initiates storage of the captured video data in a local storage element 204, as shown by block 504. When video data stored in storage element 204 reaches a predetermined capacity, processing block 506 initiates storage of captured video data in remote storage element 206.

Figures 6, 7:
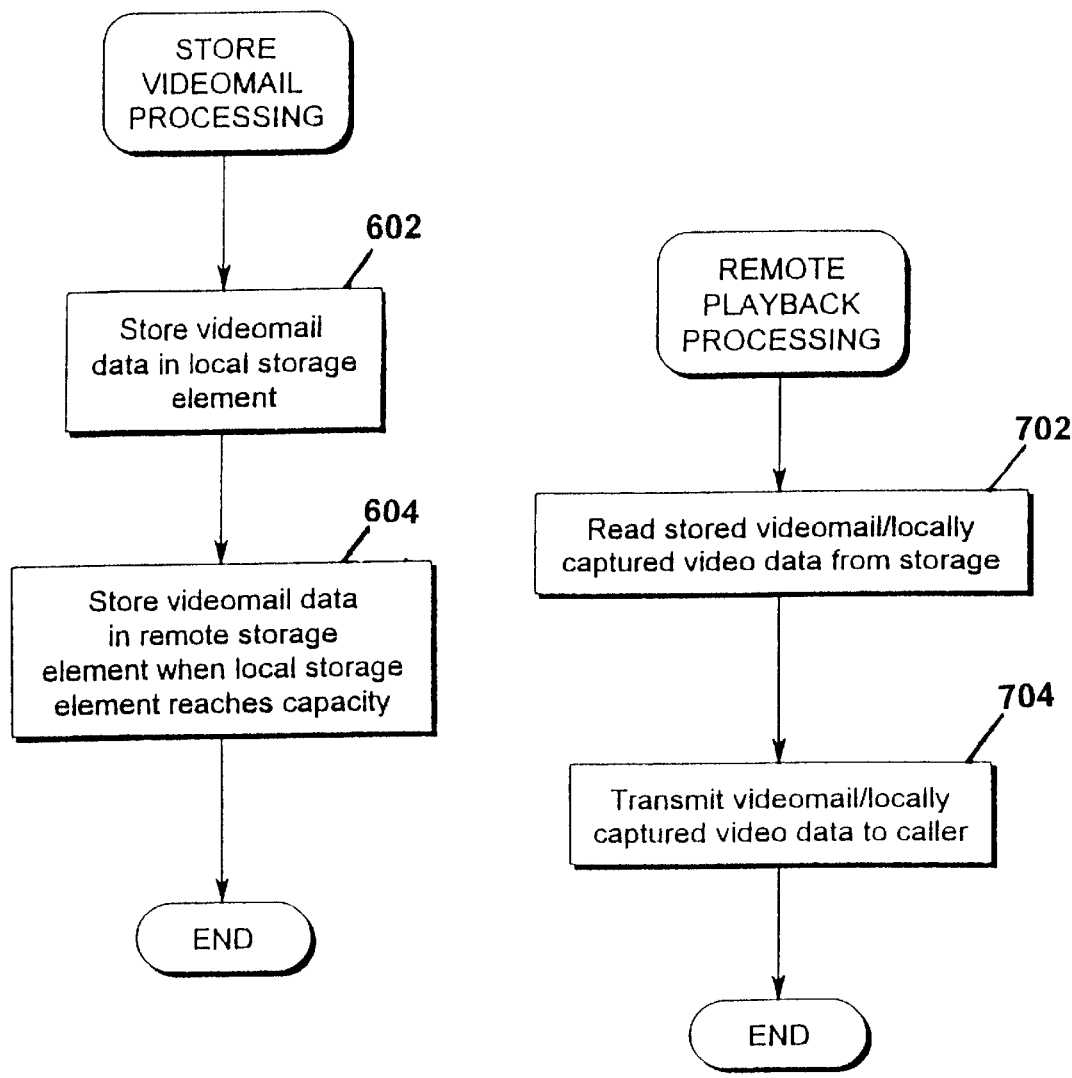
FIG. 6 is a flowchart of an example method, as performed by the videoconferencing arrangement of FIG. 2, for storing videomail for future playback.
FIG. 7 is a flowchart of an example method, as performed by the videoconferencing arrangement of FIG. 2, for remotely playing back stored videomail and locally captured video data.

FIG. 6 is a flowchart of an example method for storing videomail received via channel interface 224. Storage of videomail allows for both local and remote playback of stored videomail. As indicated at block 602, videomail received via channel interface 224 is stored in a local storage element 204. When stored videomail reaches a predetermined capacity in the local storage element 204, processing block 206 directs that additional videomail be stored in remote storage element 206.

FIG. 7 is a flowchart of an example method for remote playback of stored video data. In response to a request for playback of stored videomail for locally captured video data, processor 202 reads the videomail/locally captured video data from the appropriate storage element 204 or 206, as shown by processing block 702. At processing block 704, the video data is transmitted to the remote videoconferencing device.

Telephone 210 in the example embodiment of FIG. 2, is a conventional touch-tone telephone that is used in this arrangement for conventional telephony applications, as well as to provide an audio interface for videoconferencing using the arrangement of FIG. 2. In addition, the keypad of telephone 210 is used to provide user control for the videoconferencing arrangement including, for example, electronic pan/tilt/zoom function control, split-screen control and image size control to the remote and of local displace. For further information concerning an example method for implementing pan/tilt/zoom function control, reference may be made to U.S. patent application Ser. No. 08/861,619, entitled "Arrangement for Controlling the View Area of a Videoconferencing Device and Method Therefore" (incorporated herein by reference). Other control features and functions, including but not limited to display screen user interface features, may be implemented using keypad control operations as discussed in connection with U.S. patent application Ser. No. 09/005,053, filed Jan. 9, 1998, entitled "Videocommunicating Apparatus And Method Therefor", filed on Jan. 9, 1998 and incorporated herein by reference.

It will be understood that the processor based videoconferencing arrangements of FIGS. 1 and 2 may be implemented using any of a variety of processor arrangements, including the arrangement of the referenced patent applications and that disclosed in U.S. Pat. Nos. 5,901,258 and 5,790,712, respectively entitled and relating to issued patents also entitled "Programmable Architecture and Methods for Motion Estimation" (U.S. Pat. No. 5,594,813) and "Video Compression and Decompression Processing and Processors" (U.S. Pat. No. 5,379,351). These applications and issued patents are, incorporated herein by reference. As other example implementations, the videoconferencing arrangements of FIGS. 1 and 2 are configured as a ViaTV product available from 8×8, Inc. with such modifications as needed to connect directly to an external infrared transmitter, and as a unit having features including those of a VC55-type ViaTV phone arrangement and with the keypad control console, such as a keypad, coupled to MDPE 24 (for example, using conventional wiring or an infrared transmitter/receiver arrangement) providing control therefor. For further reference to such a video monitoring arrangement (implemented in the form of a set top box or other structure), reference may be made to the above-referenced U.S. patent application Ser. No. 09/005,053, filed Jan. 9, 1998, entitled "Videocommunicating Apparatus And Method Therefor".

In specific embodiments, a video processor circuit, such as one of types discussed above, is configured and arranged to generate the control signals in response to at least one of the following: a control signal received over the communications channel, a preprogrammed event, and a real-time user-generated command. Control signals sent by a remote terminal and received over the communications channel can be used to activate a variety of appliances that are configured with an IR receiver (or its equivalent) and, optionally, also to activate the video recording function of the camera.

Example preprogrammed events are: house alarms such as doors opening, input of facility security system passwords such as are assigned to various individuals to record when and who enters a facility, emergency-based alarms such as smoke detectors and security triggers, and time of day events. Real-time user-generated commands include, but are also not limited to, key-pad and other types of local control commands input into the system.

The various embodiments described above are provided by way of illustration only and are not intended to limit the invention. Those skilled in the art will readily recognize various modifications and changes that may be made to the present invention without strictly following the example embodiments and applications illustrated and described herein. The scope of the present invention is set forth in the following claims.

We claim:

1. A facility monitoring system, comprising:

a first communication station, including a video-signal processing arrangement and a display, configured and arranged to receive, process and display images in response to video signals sent from a remotely-located facility, the first communication station further including a user-input device adapted to generate control signals for controlling an appliance at the remotely-located facility;

a communication channel coupled to the first communication station; and a second communication station located at the remotely-located facility and communicatively coupled to the first communication station via the communication channel, the second communication station including a stand-alone video-signal processing unit, a camera and an infra-red transmitter, the stand-alone video-signal processing unit being programmed to compress and send the video signals in response to images captured by the camera and to decode the control signals and, in response to the control signals, to activate the infra-red transmitter, wherein the stand-alone video-signal processing unit and the camera are configured to process images for confirmation that the appliance has been controlled according to the control signals generated by the user-input device.

2. A facility monitoring system, according to claim 1, wherein the stand-alone video-signal processing unit is a set-top box including a port for directly coupling to the infra-red transmitter.

3. A facility monitoring system, according to claim 1, wherein the stand-alone video-signal processing unit is a video-conferencing box including a first port for directly coupling to the infra-red transmitter and a second port for coupling to a telephone circuit.

4. A facility monitoring system, according to claim 1, wherein the stand-alone video-signal processing unit is a video-communication box including a first port for directly coupling to the infra-red transmitter and a second port for coupling to a telephone circuit.

5. A facility monitoring system, according to claim 1, wherein the stand-alone video-signal processing unit is reconfigurable via the communication channel.

6. A facility monitoring system, according to claim 1, wherein the stand-alone video-signal processing unit interfaces directly with the camera and with the infra-red transmitter without using a network translation unit.

7. A facility monitoring system, according to claim 1, wherein the stand-alone video-signal processing unit interfaces directly with the camera and with the infra-red transmitter without using another processor.

8. A facility monitoring system, according to claim 1, wherein the stand-alone video-signal processing unit is a video-communication box including an interface bus configured and arranged to interface with any of a plurality of different device types, one type being the infra-red transmitter which is directly connected thereto, and including a second port for coupling to a telephone circuit, wherein the stand-alone video-signal processing unit interfaces directly with the camera and with the infra-red transmitter without using another processor.

9. A facility monitoring system, according to claim 1, wherein the stand-alone video-signal processing unit is adapted to store images for subsequent playback by the first communication channel in response to another control signal sent via the communication channel.

10. A facility monitoring system, comprising:
a first communication station including a video-signal processing arrangement and a display configured and arranged to receive, process and display images in response to video signals sent from a remotely-located facility, the first communication station further including a user-input device adapted to generate control signals for controlling an appliance at the remotely-located facility;
a communication channel coupled to the first communication station; and
a second communication station located at the remotely-located facility and communicatively coupled to the first communication station via the communication channel, the second communication station including a camera, an infra-red transmitter, and stand-alone means for processing video signals and for compressing and sending the video signals in response to images captured by the camera and for decoding the control signals and, in response to the control signals, for activating the infra-red transmitter, wherein the stand-alone video-signal processing means and the camera are configured to process images for confirmation that the appliance has been controlled according to the control signals generated by the user-input device.

11. For use as part of a facility monitoring system having a communication channel coupled to a first communication station including a video-signal processing arrangement and a display configured and arranged to receive, process and display images in response to video signals sent from a remotely-located facility, the first communication station further including a user-input device adapted to generate control signals for controlling an appliance at the remotely-located facility, a second, remotely-located communication terminal comprising: a camera; an infra-red transmitter; and a stand-alone means for processing video signals and for compressing and sending the video signals in response to images captured by the camera and for decoding the control signals and, in response to the control signals, for activating the infra-red transmitter, wherein the stand-alone video-signal processing means and the camera are configured to process images for confirmation that the appliance has been controlled according to the control signals generated by the user-input device.

* * * * *